US010664068B2

(12) United States Patent
Palacios Camarero et al.

(10) Patent No.: US 10,664,068 B2
(45) Date of Patent: May 26, 2020

(54) PHYSICAL DOCUMENT FOR NAVIGATION

(71) Applicant: HEWLETT-PACKARD DEVELOPMENT COMPANY, L.P., Houston, TX (US)

(72) Inventors: Virginia Palacios Camarero, Terrassa (ES); Jordi Sanroma Garrit, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 25 days.

(21) Appl. No.: 15/542,497

(22) PCT Filed: Jan. 30, 2015

(86) PCT No.: PCT/US2015/013972
§ 371 (c)(1),
(2) Date: Jul. 10, 2017

(87) PCT Pub. No.: WO2016/122663
PCT Pub. Date: Aug. 4, 2016

(65) Prior Publication Data
US 2018/0284911 A1 Oct. 4, 2018

(51) Int. Cl.
*G06F 3/0354* (2013.01)
*G06F 3/0482* (2013.01)
(52) U.S. Cl.
CPC ........ *G06F 3/03545* (2013.01); *G06F 3/0482* (2013.01); *G06F 2203/0384* (2013.01); *G06F 2203/04807* (2013.01)

(58) Field of Classification Search
CPC .............. G06F 3/03545; G06F 3/0482; G06F 2203/0384; G06F 2203/04807
See application file for complete search history.

(56) References Cited

U.S. PATENT DOCUMENTS 5,250,929 A * 10/1993 Hoffman ............... G06F 3/0488
178/18.03
8,270,769 B2 * 9/2012 Judelson ................ G06T 19/00
345/619
8,429,174 B2 4/2013 Ramani et al.
(Continued)

FOREIGN PATENT DOCUMENTS

WO WO-2008121586 10/2008

OTHER PUBLICATIONS

Song, H. et al., The ModelCraft Framework: Capturing Freehand Annotations and Edits to Facilitate the 3D Model Design Process Using a Digital Pen, ACM Transactions on Computer-Human-Interaction vol. 16 No. 3 Article 14, Sep. 2009, 33 pages.

*Primary Examiner* — Sahlu Okebato
(74) *Attorney, Agent, or Firm* — Brooks Cameron & Huebsch PLLC

(57) ABSTRACT

In one implementation, a system for using a physical document for navigation includes a receiver engine to receive an identifier location corresponding to an area selected on the physical document, a location engine to determine a location within a digital representation of the physical document corresponding to the identifier location, and a display engine to display information relating to the identifier location based on the identifier location and the corresponding location within the digital representation of the physical document.

14 Claims, 3 Drawing Sheets

(56) References Cited

U.S. PATENT DOCUMENTS

| | | |
|---|---|---|
| 8,626,135 B1 | 1/2014 | Schilit et al. |
| 2001/0032221 A1* | 10/2001 | Anwar ................. G06F 3/1203 715/209 |
| 2004/0229195 A1* | 11/2004 | Marggraff .......... G06K 7/10881 434/169 |
| 2009/0128520 A1* | 5/2009 | Combe ............... G06F 3/03545 345/179 |
| 2011/0176179 A1* | 7/2011 | Judelson ................. G06T 19/00 358/448 |
| 2011/0216001 A1 | 9/2011 | Song et al. |
| 2012/0192068 A1 | 7/2012 | Migos et al. |
| 2013/0033461 A1 | 2/2013 | Silverbrook |
| 2013/0212470 A1 | 8/2013 | Apple Inc |
| 2014/0063003 A1 | 3/2014 | Kaula et al. |
| 2014/0210947 A1 | 7/2014 | Finn et al. |

\* cited by examiner

PHYSICAL DOCUMENT FOR NAVIGATION

BACKGROUND

Print documents have traditionally been used to convey technical information to readers. In the digital age, however, a trend has begun to utilize electronic devices to present this information to users rather than using print documents. Those who prefer print documents may find it difficult to navigate these digital documents due to a complicated user interface or for various other reasons. As digital documents can be very easy to collaboratively work on and share, those who prefer print documents can become disconnected from the digital work place.

DETAILED DESCRIPTION

Figure 1:
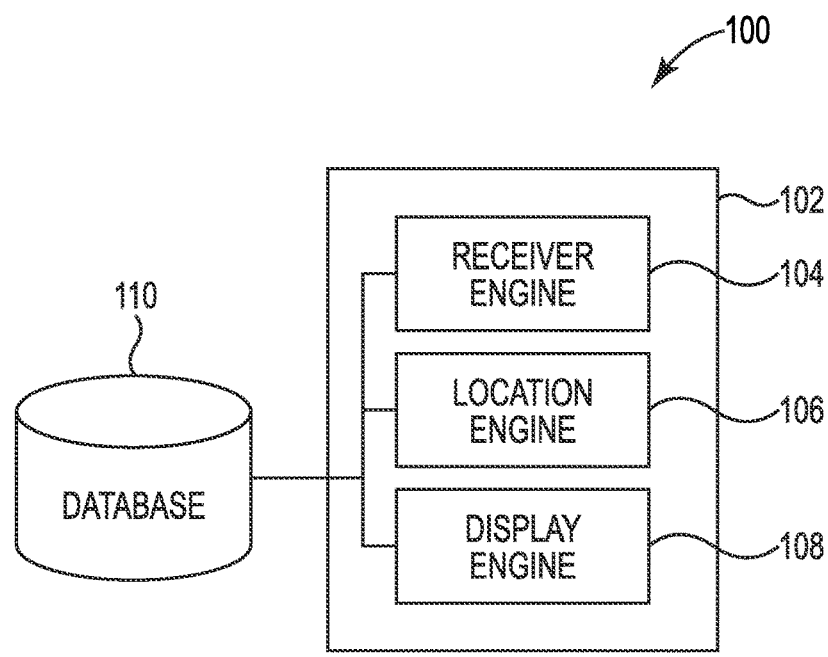
FIG. 1 illustrates a diagram of an example of a system for a physical document for navigation consistent with the present disclosure.

A number of methods, systems, and computer readable medium for a print document for navigation are described herein. The digital transformation has created a gap between technologically savvy individuals working with digital documents and experienced individuals used to working with print documents (e.g., physical documents, etc.). However, not everyone can or wants to use digital documents. As a result, individuals who prefer print documents are disconnected from the digital workflow.

As used herein, print document for navigation refers to using a digital identifier on a physical document to navigate a digital representation of the physical document. As used herein, a physical document may include a substrate comprising a number of patterns that can be read by a digital identifier. The substrate may include a piece of paper, a digital user interface, and/or other suitable substrate for displaying the number of patterns. The number of patterns may be printed on the substrate and/or displayed on the substrate. For example, the number of patterns may be printed with an ink material, an electronic ink material, and/or other suitable marking material that can be utilized with a substrate to present the number of patterns. In another example, the physical document may include a piece of paper with a printed printing fluid (e.g., ink) to present the number of patterns (e.g., print document). Examples herein described relative to a print document may likewise be used with any types of physical documents. The digital identifier may be used to select an area printed, presented, or displayed on a physical document, and view information about the corresponding selection on a digital visualization of the physical document.

A physical document can include a print area that includes a document identification pattern, a menu pattern, and a coordinate positioning system. The document identification pattern can identify the particular physical document in use. By reading the document identification pattern, a system can determine which physical document is in use, as well as determine the corresponding digital representation that includes information relating to the selection on the physical document.

Menu patterns can include patterns presented on the physical document. These patterns can be read by a digital identifier. The patterns may be configured to determine a type of information to be displayed in the digital representation of the physical document.

As used herein, the digital identifier may include e.g., a device with an attached camera, scanner, reader, and/or other suitable devices, or combinations thereof. The digital identifier may be used to select an identifier location on the physical document, as will be further described herein. The digital identifier can then transmit the identifier location information, defined by a coordinate positioning system presented on the physical document, to the system. The system can then display information within the digital representation of the physical document corresponding to the identifier location as a digital visualization of the physical document.

Figure 2:
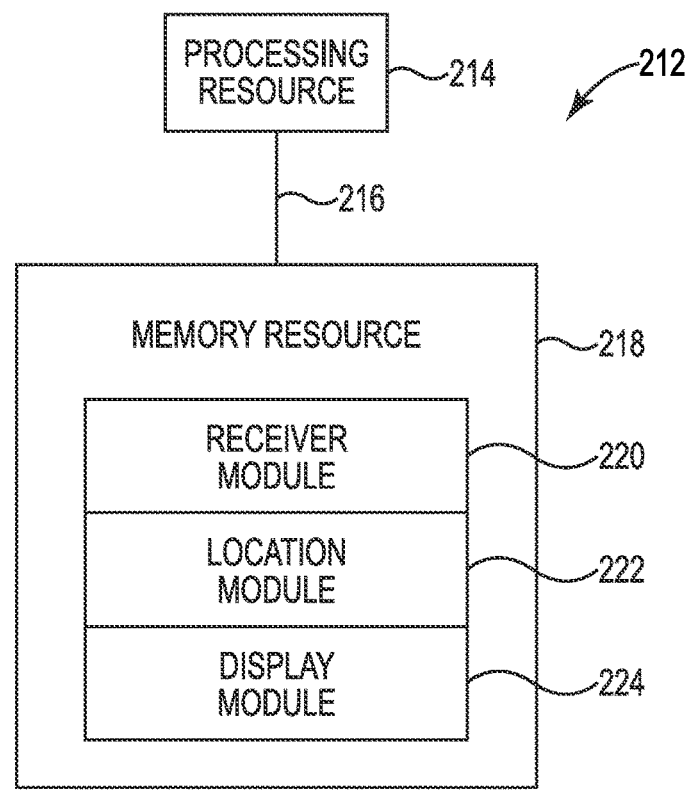
FIG. 2 illustrates a diagram of an example computing device consistent with the present disclosure.

FIGS. 1 and 2 illustrate examples of system 100 and computing device 212 consistent with the present disclosure. FIG. 1 illustrates a diagram of an example of a system 100 for a physical document for navigation consistent with the present disclosure. The system 100 can include a database 110, a physical document for navigation system 102, and/or a number of engines (e.g., receiver engine 104, location engine 106, display engine 108). The physical document for navigation system 102 can be in communication with the database 110 via a communication link, and can include the number of engines (e.g., receiver engine 104, location engine 106, display engine 108). The physical document for navigation system 102 can include additional or fewer engines that are illustrated to perform the various elements as will be described in further detail in connection with FIGS. 3-4.

The number of engines (e.g., receiver engine 104, location engine 106, display engine 108) can include a combination of hardware and machine readable instructions (e.g., stored in a memory resource such as a non-transitory machine readable medium) that are executable using hardware components such as a processor, but at least hardware, to perform elements described herein (e.g., receive an identifier location corresponding to an area on the physical document, determine a location within a digital representation of the physical document corresponding to the identifier location, display information relating to the selected identifier location based on the identifier location and the corresponding location within the digital representation of the physical document, etc.).

The receiver engine 104 can include hardware and/or a combination of hardware and machine readable instructions, but at least hardware, to receive an identifier location corresponding to an area selected on a physical document. As used herein, an identifier location can include a location on a physical document selected by a digital identifier, as will be further described herein. The location on the physical document can be defined by a coordinate positioning system presented on the physical document. That is, the coordinate positioning system may be used to define the identifier location on the physical document.

The location engine 106 can include hardware and/or a combination of hardware and machine readable instructions, but at least hardware, to determine a location within a digital representation of the physical document corresponding to the identifier location. For example, the location engine can utilize the received identifier location selected on the physical document to determine the corresponding location in the digital representation of the physical document.

The display engine 108 can include hardware and/or a combination of hardware and machine readable instructions, but at least hardware, to display information relating to the selected identifier location based on the identifier location and the corresponding location within the digital representation of the physical document.

The database 110 can include digital information relating to physical documents. That is, the database 110 can be utilized to store digital representations of physical documents. For example, the physical document can include content (e.g., graphical information, textual information, or both), e.g., the print document can be a construction document detailing locations of doors. The database 110 can include a digital version of the construction document detailing the locations of the doors.

FIG. 2 illustrates a diagram of an example computing device 212 consistent with the present disclosure. The computing device 212 can include hardware, machine readable instructions on a non-transitory machine readable medium, or a combination thereof, to perform the elements described herein.

The computing device 212 can be any combination of hardware and machine readable instructions configured to share information. The hardware, for example, can include a processing resource 214 and/or a memory resource 218 (e.g., computer-readable medium (CRM), machine readable medium (MRM), database, etc.). A processing resource 214, as used herein, can include any number of processors capable of executing instructions stored by a memory resource 218. Processing resource 214 may be implemented in a single device or distributed across multiple devices. The machine readable instructions (e.g., computer readable instructions (CRI)) can include instructions stored on the memory resource 218 and executable by the processing resource 214 to implement a desired element (e.g., receive an identifier location corresponding to an area selected on a print document, determine a location within a digital representation of the print document corresponding to the identifier location, and display information relating to the selected identifier location based on the identifier location and the corresponding location within the digital representation of the print document, etc.).

The memory resource 218 can be in communication with a processing resource 214. A memory resource 218, as used herein, can include any number of memory components capable of storing instructions that can be executed by processing resource 214. Such memory resource 218 can be a non-transitory CRM or MRM. Memory resource 218 may be integrated in a single device or distributed across multiple devices. Further, memory resource 218 may be fully or partially integrated in the same device as processing resource 214 or it may be separate but accessible to that device and processing resource 214. Thus, it is noted that the computing device 212 may be implemented on a participant device, on a server device, on a collection of server devices, and/or a combination of the participant device and the server device.

The memory resource 218 can be in communication with the processing resource 214 via a communication link (e.g., a path) 216. The communication link 216 can be local or remote to a machine (e.g., a computing device) associated with the processing resource 214. Examples of a local communication link 216 can include an electronic bus internal to a machine (e.g., a computing device) where the memory resource 218 is one of volatile, non-volatile, fixed, and/or removable storage medium in communication with the processing resource 214 via the electronic bus.

A number of modules (e.g., receiver module 220, location module 222, display module 224) can include CRI that when executed by the processing resource 214 can perform elements. The number of modules (e.g., receiver module 220, location module 222, display module 224) can be sub-modules of other modules. For example, the location module 222 and the display module 224 can be sub-modules and/or contained within the same computing device. In another example, the number of modules (e.g., receiver module 220, location module 222, display module 224) can comprise individual modules at separate and distinct locations (e.g., CRM, etc.).

Each of the number of modules (e.g., receiver module 220, location module 222, display module 224) can include instructions that when executed by the processing resource 214 can function as a corresponding engine as described herein. For example, the receiver module 220 can include instructions that when executed by the processing resource 214 can function as the receiver engine 104. In another example, the location module 222 can include instructions that when executed by the processing resource 214 can function as the location engine 106. In another example, the display module 224 can include instructions that when executed by the processing resource 214 can function as the display engine 108.

Figure 3:
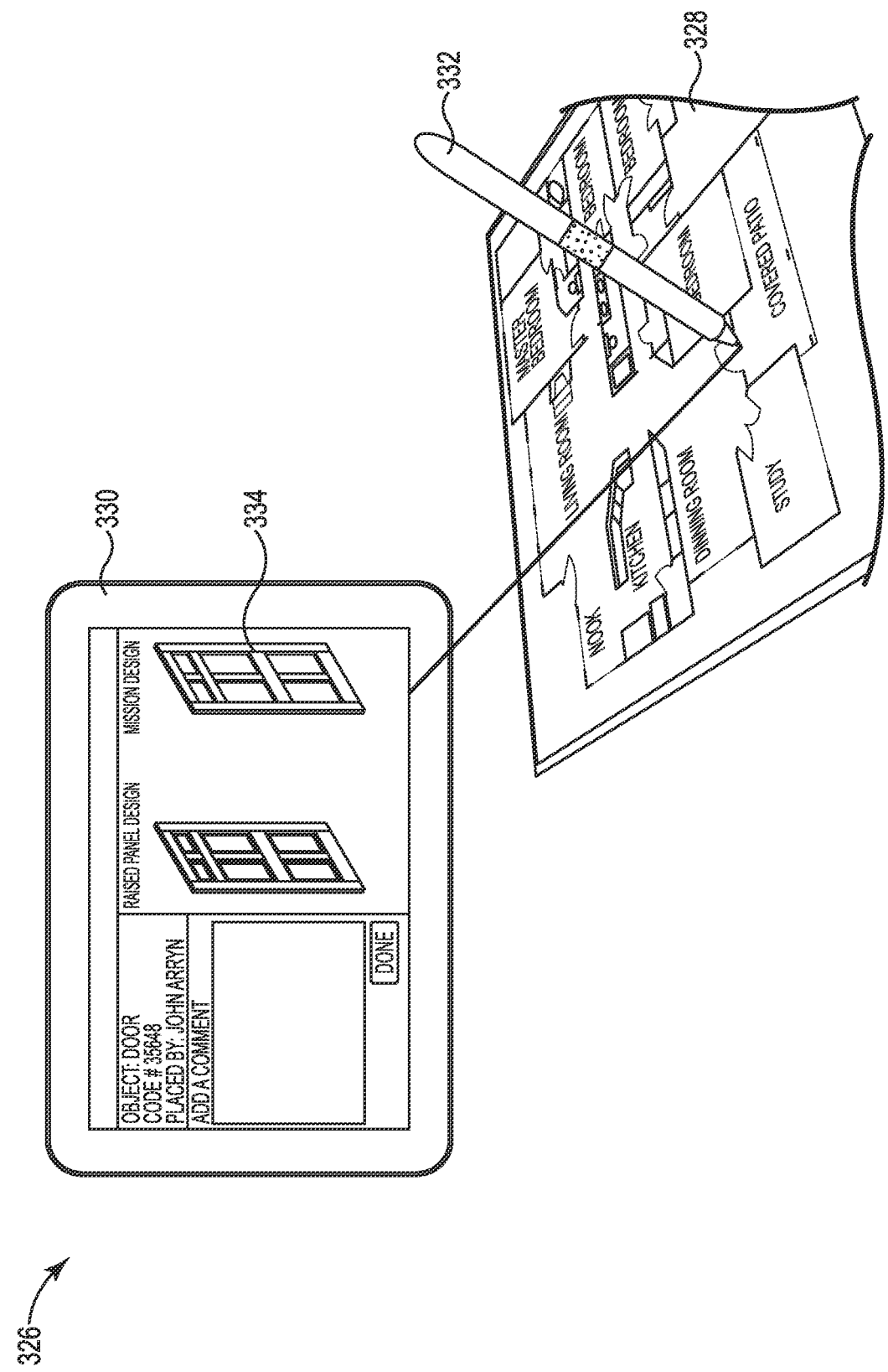
FIG. 3 illustrates an example print document for navigation system consistent with the present disclosure.

FIG. 3 illustrates a print document for navigation system 326 consistent with the present disclosure. The digital visualization of a print document 334 may be a virtual representation of print document 328, and may be displayed as a virtual representation on a user interface 330.

In some examples, the print document 328 can be a physical document with a substrate that is paper and a printed ink on the paper to present a number of patterns. In some examples, a print document can include a printed piece of paper. Print document 328 can include various sizes of paper, as well as various paper types. For example a print document can be a standard letter sized (e.g., 8.5"×11") copy paper. As an additional example, a print document can be an architectural (e.g., 30"×42") paper.

In some examples, a print document can include an electronic paper (e.g., e-paper or electronic ink). Electronic paper can include display technology that mimics the appearance of ordinary ink on paper. For example, electronic paper can include Gyricon displays, electrophoretic displays, electro-wetting displays, electrofluidic displays, or any other similar type of electronic display that can mimic an ordinary ink on paper document.

Print document 328 can include a print area. As used herein, the print area is the area on the paper that is covered with print. The print area can include a document identification pattern, a menu pattern, and/or a coordinate positioning system.

In some examples, the print area can include the entire print document. For example, the print area can cover an entire 30×42 inch architectural document. However, the print area in some examples may include only a portion of the print document. For example, the print area can cover an area only 28×40 inch of a 30×42 inch architectural document.

Print document 328 can include a document identification pattern. A document identification pattern identifies the particular print document in use. For example, a document identification pattern can identify for a computing system (e.g., computing system 212 as referenced in FIG. 2, etc.) a print document displaying and/or presenting content. In this example, the content that is presented on the print document can include a heating, ventilation, and air-conditioning systems (HVAC). In another example, a different document identification pattern can identify content that is presented on a print document to include an electrical wiring system for a computing system. The document identification pattern can differentiate between a number of different print documents for a computing system.

The document identification pattern can be defined using a number of different types of patterns. A document identification pattern can include a number of codes to identify the print document, such as a linear bar code (e.g., a UPC code), a quick response (QR) code, a data matrix code, or any other code suitable to represent information that is identifiable by a reading device. For example, a number of different print documents can each include a unique QR code that may be used to distinguish the number of different print documents for the computing system.

A document identification pattern can be located within the print area in a conspicuous location on print document 328. Placement of the document identification pattern in a conspicuous area can remind a user to select the document identification pattern using a digital identifier 332, as will be further described herein, so that the computing system can identify the particular print document in use.

Print document 328 can include menu patterns. Menu patterns can be configured to determine a type of information to be displayed on user interface 330. For example, a menu pattern can be defined to show a particular view of an object selected on print document 328 (e.g., a profile view). Additionally, a menu pattern can be defined to show, on user interface 330, technical information about an object selected on print document 328 (e.g., the dimensions of a corridor). Further, a menu pattern can be defined to determine the type of view to display via user interface 330 (e.g., 2D or 3D).

Similar to document identification patterns, menu patterns can include linear bar codes (e.g., a UPC code), QR codes, or data matrix codes. For example, a number of different menu options can each include a unique UPC code that may be used to determine the type of information to be displayed via user interface 330 when selected.

In various examples, menu patterns can be defined within system 326 such that the menu patterns may not be presented on print document 328. For example, digital identifier 332 can select a menu pattern not presented on print document 328 by reading an area on print document 328 that has been pre-defined in system 326 as a menu pattern.

The menu patterns can be located in a conspicuous location within the print area on print document 328. Placement of menu patterns in a conspicuous area can allow a user to easily make a selection on print document 328 using digital identifier 332 as to the type of information the user would like to see displayed via user interface 330. Menu patterns located on print document 328 can be helpful to a user who may have trouble navigating using user interface 330 by allowing the user to easily make choices about information to be displayed on user interface 330, but allowing the user to do so on print document 328.

Print document 328 can include a coordinate positioning system. The coordinate positioning system can be configured to define, within the print document 328, the location of an identifier location selected with digital identifier 332, as will be further described herein. For example, a coordinate positioning system can define a location (e.g., identifier location) on print document 328 by using a pair of numerical coordinates measured from a coordinate axis.

In some examples, the coordinate positioning system can include a grid with coordinate axes. For example, the grid can comprise spacing marked by a grid defined by the coordinate axes. The identifier location selected on print document 328 can be determined by utilizing the grid defining the coordinate location.

In some examples, the coordinate positioning system can include a watermark grid. For example, the watermark grid can be presented (e.g., printed, displayed, etc.) using ink that is not easily visible to a user. That is, the watermark grid can be presented in a manner that is very faint to the human eye. For example, the watermark grid can appear as a shade that is slightly darker than the rest of the print document, allowing the user to see the watermark grid but not in a manner that is distracting. Digital identifier 332 can determine the identifier location using the watermark grid.

In some examples, the watermark grid can be presented using ink that is invisible to a user. When looking at print document 328, a user may not be able to see the grid. However, the digital identifier 332 can still define a position within the grid using the invisible watermark grid. An invisible watermark grid can allow for the digital identifier 332 to determine its position on the grid and not be distracting to the user of print document 328.

In some examples, the grid can be presented using a dot grid. For example, print document 328 can include a grid of dots spaced at various intervals (e.g., four dots per inch). The dots can be presented using ink visible to the user, or using ink that is invisible to the user. In another example, the dots can be small perforations in print document 328.

A digital identifier 332 can be used to make selections on print document 328. For example, digital identifier 332 can be used to read a document identification pattern consisting of a QR code to identify for a computing system the particular print document being used. Additionally, digital identifier 332 can be used to read menu patterns placed on print document 328 to determine a type of information to be displayed via user interface 330.

In various examples, digital identifier 332 can include a camera, scanner, reader, or other type of mechanism to identify and scan various items on print document 328. For example, digital identifier 332 can be a stylus or digital pen capable of scanning and/or reading print document 328. As an additional example, digital identifier 332 can include a tablet or mobile phone capable of scanning and/or reading print document 328.

Although digital identifier 332 is described as a stylus, digital pen, or tablet/mobile phone, examples of the present disclosure are not so limited. For example, digital identifier 332 can include any device capable of identifying and scanning various items on print document 328.

In some examples, digital identifier 332 can wirelessly transmit information to a computing device. For example, digital identifier 332 can scan a document identification pattern and wirelessly transmit the scanned information to a computing device. Wireless communication between digital identifier 332 and a computing device can be accomplished using Wi-Fi, Bluetooth, near field communication (NFC), or any other suitable method for wireless transmission. However, in other examples, a wired connection may be used.

Digital identifier 332 can be utilized to select an identifier location located on print document 328. An identifier location, as used herein, is a location on print document 328 selected by a user using digital identifier 332. The identifier location can include characteristics on the print document 328 that correspond to an object or a space within a digital representation of the print document, displayed as a digital visualization of a print document 334 via user interface 330. For example, a representation of a door located on print document 328 is associated with identifier location information representing the door included in a digital representation of the print document.

In various examples, digital identifier 332 can include accelerometers, gyroscopes, or other motion sensors to recognize handwriting or gestures defined to execute a certain action. For example, a user can perform a gesture (e.g., draw a circle) using digital identifier 332 to in order to manipulate the view (e.g., pan the view 180°, 360°, etc.) displayed on user interface 330.

In various examples, digital identifier 332 can include the use of global positioning systems (GPS), wireless internet connections (e.g., Wi-Fi), Internet of Things (IoT) sensors, or other sensors to recognize gestures or track movement of digital identifier 332. For example, a user can move to a different room (e.g., move from a conference room to an office) with digital identifier 332 to manipulate the view or change the information displayed (e.g., display information about the office) on user interface 330.

In an example of the present disclosure, a computing device can receive, from digital identifier 332, an identifier location corresponding to an area on print document 328. The computing device can determine a location within a digital representation of print document 328 corresponding to the identifier location, and display via user interface 330 a visualization of the selected identifier location using the identifier location and the corresponding location within the digital representation of print document. For example, a user can utilize digital identifier 332 to select a particular object located on print document 328, and then view the object or information about the object on user interface 330.

The computing device can comprise instructions to display additional menu options via user interface 330 upon receiving a selection of an identifier location on print document 328. Additional menu options can allow a user to select additional information to be displayed that relates to the selected identifier location. Additional menu options can include displaying the properties of the selected identifier location. For example, a user may select a door located on print document 328 that results in the display of the door and its dimensions via user interface 330. The user can elect to view other properties about the door via the additional menu options, such as mounting instructions when installing the door, safety specifications when inspecting the door, warranty information for facilities management, as well as a schedule for reporting or inventory purposes.

In some examples, the computing device can define user permission levels for accessing certain additional menu options. For example, the computing device can allow a mechanic access to information regarding equipment, layout, or other additional information relating to building functionality. The computing device can also prevent the mechanic from accessing information relating to building security, if that information is not relevant to the mechanic's duties.

The computing device can receive instructions to alter the location within the digital representation of the print document. For example, a user can select a different object on print document 328 using digital identifier 332 that has new identifier location information. The computing device can then locate the corresponding new identifier location information within the digital representation of the print document and display the digital visualization 334 corresponding to the new selection from print document 328 via user interface 330.

In some examples, the computing device can receive instructions to alter the information displayed via user interface 330 corresponding to the selected identifier location. For example, a user can select an alternate menu pattern presented on print document 328 to change the type of information displayed about the current selected identifier location.

The computing device can receive instructions to print a new print document based on a selection to print altered location information. For example, a user may select an identifier location on print document 328 to be displayed via user interface 330, and make a menu selection such that the user interface 330 displays a more detailed floor plan of a conference room only. The user can select to print a new print document showing the detailed floor plan of the conference room. The new print document will include a unique document identification pattern corresponding to the altered location and information, as well as different menu patterns and a different coordinate positioning system. This new print document can also be used with digital identifier 332 to make additional identifier location selections to be displayed via user interface 330.

In some examples, the types of menu patterns can be selected to be printed and/or presented on the new print document. For example, the user can select the menu patterns to be presented as UPC codes. Additionally, the user can define the menu patterns to be presented. For example, the user can select four menu patterns to be presented, each menu pattern defined to display a different type of information.

In some examples, the user can select the type of coordinate positioning system to be used on the new print document. The user can select a visible grid to be shown on the print document. Additionally, the user can select a grid that is visible only to digital identifier 332, or any other grid that is suitable for the new print document.

As described herein, a digital identifier can be used to select a paper document, which is then displayed as a digital representation of the paper document on a user interface. A user can further select an object located on the document, which will then be displayed on the user interface with additional information and menu options. The additional menu options can be utilized to display further additional information about the selected object. Utilizing this system, a user who may not be technically proficient can easily navigate a digital version of a print document.

Figure 4:
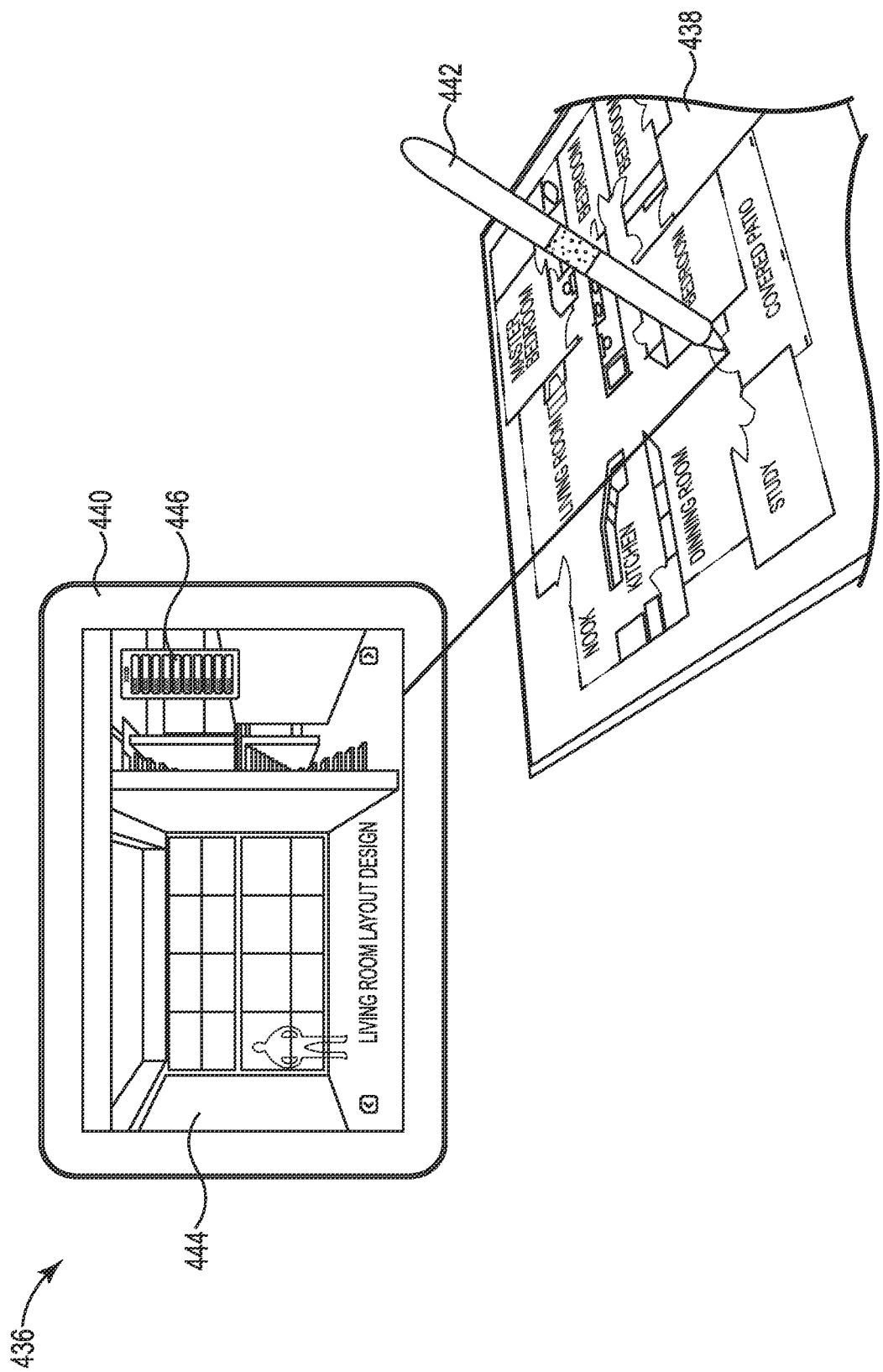
FIG. 4 illustrates an example print document for navigation system consistent with the present disclosure.

FIG. 4 illustrates a print document for navigation system 436 consistent with the present disclosure. The 3D visualization 444 is a 3D representation of a 2D print document 438. The 3D visualization 444 can be displayed on a user interface 440.

The 3D visualization 444 is a 3D visualization of a selection of an identifier location on print document 438. For example, a user can utilize a digital identifier 442 to select a conference room on print document 438. A computing device (e.g., computing device 212 as referenced in FIG. 2, etc.) can receive the identifier location corresponding to a location on print document 438 from the digital identifier 442 and determine a location of the identifier location within a digital representation of the print document (e.g., digital representation of a print document located in database 110, as referenced in FIG. 1, etc.). The computing device can display the 3D visualization 444 via user interface 440.

The particular print document 438 that is in use can be identified by a document identification pattern included on print document 438. Similar to print document 328 as referenced in FIG. 3, the document identification pattern can include patterns such as linear bar codes, QR codes, data matrix codes, or any other code suitable to represent information.

A number of menu options 446 can be selected via user interface 440. Menu options 446 can allow a user to view additional information about the object selected from print document 438. For example, a user can select via menu options 446 to pan the view (e.g., pan the view 180°, 360°, etc.). Additionally, a user may elect to view technical information about the object selected from the 2D print document 438, such as the type of material (e.g., concrete, drywall, etc.) used to construct the walls of a space.

The print document 438 can include menu patterns. Similar to print document 328 as referenced in FIG. 3, menu patterns can be configured to determine a type of information to be displayed on user interface 440 based on the pattern selected. For example, print document 438 can include a number of different QR codes, each code defined to cause the user interface 440 to display a type of information. These menu patterns can allow a user to select from print document 438 additional or different information to view without making a selection from user interface 440.

In various examples, menu patterns can be defined within system 436 such that the menu patterns may not be presented on print document 438. For example, digital identifier 442 can select a menu pattern not presented on print document 438 by reading an area on print document 438 that has been pre-defined in system 436 as a menu pattern.

In some examples, the user can use digital identifier 442 to navigate the 3D visualization 444 of print document 438. Digital identifier 442 can include accelerometers, gyroscopes, or other motion sensors to recognize handwriting or gestures defined to execute a certain action. For example, a user can perform a gesture (e.g., draw a circle) using digital identifier 442 to in order to manipulate the view (e.g., pan 180°) displayed on user interface 440.

In various examples, digital identifier 442 can include the use of global positioning systems (GPS), wireless internet connections (e.g., Wi-Fi), Internet of Things (IoT) sensors, or other sensors to recognize gestures or track movement of digital identifier 442. For example, a user can move to a different room (e.g., move from a conference room to an office) with digital identifier 442 to manipulate the view or change the information displayed (e.g., display information about the office) on user interface 440.

As described herein, a digital identifier can be used to select a paper document, which is then displayed as a digital representation of the paper document on a user interface. A user can further select an object located on the document, which will then be displayed on the user interface with additional information and menu options. The additional menu options can be utilized to display further additional information about the selected object. Utilizing this system, a user who may not be technically proficient can easily navigate a digital version of a print document.

As used herein, "logic" is an alternative or additional processing resource to perform a particular action and/or element described herein. Logic can include hardware. The hardware can include processing resources such as circuitry, which are distinct from machine readable instructions on a machine readable media. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system for using a physical document for navigation, comprising:
   a receiver engine to receive an identifier location corresponding to an object in an area of two-dimensional (2D) content that is selected on the physical document and a menu pattern to define a particular view of the object to be shown and to show technical information associated with the object, wherein the physical document comprises a printed paper that contains the identifier location of the object;
   a location engine to determine a location within a three-dimensional (3D) digital representation of the physical document corresponding to the identifier location; and
   a display engine to display information relating to the identifier location based on the identifier location, the particular view of the object and the technical information associated with the object based on the menu pattern, and the corresponding location within the 3D digital representation of the 2D content in the physical document, wherein the information comprises a 3D visualization of the object.

2. The system of claim 1, wherein the physical document includes a substrate with a material on the substrate to display a document identification pattern, a menu pattern, and a coordinate positioning system recognizable by a digital identifier.

3. The system of claim 2, wherein the document identification pattern identifies a particular physical document.

4. The system of claim 2, wherein the menu pattern is to allow determination of a type of information to be displayed.

5. The system of claim 2, wherein the coordinate positioning system is to define the identifier location within the physical document.

6. The system of claim 1, wherein the physical document comprises content of the digital representation displayed on the printed paper.

7. The system of claim 1, further comprising:
   a digital identifier to be used to select the identifier location on the physical document, wherein the digital identifier includes a camera, scanner, or reader.

8. A non-transitory computer readable medium storing instructions executable by a processing resource to cause a controller to:
   receive, from a digital identifier, an identifier location corresponding to an object in an area of two-dimensional (2D) content on a print document and a menu pattern to define a particular view of the object to be shown and to show technical information associated with the object, wherein the print document comprises the 2D content that is printed on a paper substrate that contains the identifier location of the object;
   determine a location within a three-dimensional (3D) digital representation of the print document corresponding to the identifier location, wherein the 3D digital representation includes additional content from the 2D content that is presented on the substrate; and
   display, via a user interface, the additional content related to the identifier location using the identifier location, the particular view of the object and the technical information associated with the object based on the menu pattern, and the corresponding location within the 3D digital representation of the 2D content in the print document, wherein the information comprises a 3D visualization of the object.

9. The medium of claim 8, comprising instructions to display additional menu options upon receiving a selection of the identifier location on the print document, wherein the additional menu options display additional information relating to the identifier location.

10. The medium of claim 8, comprising instructions to alter the location and information displayed upon receiving a selection of a different input.

11. The medium of claim 10, comprising instructions to print a different print document based on a selection to print the location that is altered and the information on a different print document and, wherein the different print document includes:
- a document identification pattern of the location that is altered and the information;
- different menu patterns; and
- a different coordinate positioning system.

12. A method for using a print document having two-dimensional (2D) content for navigation, comprising:
- receiving, at a computing device, an identifier location corresponding to an object in an area of the 2D content on the print document from a digital identifier and a menu pattern to define a particular view of the object to be shown and to show technical information associated with the object, wherein the print document comprises a printed paper that contains the identifier location of the object;
- determining a location within a three-dimensional (3D) digital representation of the print document corresponding to the identifier location; and
- displaying information about the identifier location in a 3D visualization of the print document using the identifier location, the particular view of the object and the technical information associated with the object based on the menu pattern, and the corresponding location within the 3D digital representation of the 2D content in the print document, wherein the information comprises a 3D visualization of the object.

13. The method of claim 12, comprising identifying the print document and corresponding 3D digital representation of the print document via the digital identifier based on a document identification pattern included on the print document.

14. The method of claim 12, comprising selecting a number of menu options on the print document via the digital identifier, wherein the number of menu options determine a type of information to be displayed via a user interface.

* * * * *